United States Patent [19]
Pesheck et al.

[11] Patent Number: 5,182,425
[45] Date of Patent: Jan. 26, 1993

[54] THICK METAL MICROWAVE SUSCEPTOR

[75] Inventors: Peter S. Pesheck, Minneapolis; Ronald R. Lentz, Plymouth, both of Minn.

[73] Assignee: The Pillsbury Company, Minneapolis, Minn.

[21] Appl. No.: 609,910

[22] Filed: Nov. 6, 1990

[51] Int. Cl.⁵ .............................................. H05B 6/80
[52] U.S. Cl. ...................... 219/10.55 E; 219/10.55 F; 426/107; 426/234; 99/DIG. 14
[58] Field of Search .................. 219/10.55 E, 10.55 F, 219/10.55 M; 426/107, 234, 243, 113; 99/DIG. 14; 333/242; 361/321; 428/198

[56] References Cited

U.S. PATENT DOCUMENTS

| | | | |
|---|---|---|---|
| 3,271,169 | 9/1966 | Baker et al. | 426/107 |
| 3,353,968 | 11/1967 | Krajewski | 426/107 |
| 3,783,220 | 1/1974 | Tanizaki | 219/10.55 M |
| 3,865,301 | 2/1975 | Pothier et al. | 426/107 |
| 3,934,106 | 1/1976 | MacMaster et al. | 219/10.55 E |
| 3,946,188 | 3/1976 | Derby | 219/10.55 E |
| 3,965,323 | 6/1976 | Forker, Jr. et al. | 219/10.55 E |
| 4,015,085 | 3/1977 | Woods | 219/10.55 E |
| 4,032,865 | 6/1977 | Harp et al. | 333/242 |
| 4,143,647 | 3/1979 | Husslein et al. | 219/10.55 E |
| 4,190,757 | 2/1980 | Turpin et al. | 219/10.55 E |
| 4,230,924 | 10/1980 | Brastad et al. | 219/10.55 E |
| 4,266,108 | 5/1981 | Anderson et al. | 219/10.55 E |
| 4,283,427 | 8/1981 | Winters et al. | 426/107 |
| 4,369,346 | 1/1983 | Hart et al. | 219/10.55 E |
| 4,398,077 | 8/1983 | Freedman et al. | 219/10.55 E |
| 4,486,640 | 12/1984 | Bowen et al. | 219/10.55 E |
| 4,496,815 | 1/1985 | Jorgensen | 219/10.55 E |
| 4,542,271 | 9/1985 | Tanonis et al. | 219/10.55 E |
| 4,641,005 | 2/1987 | Seiferth | 219/10.55 E |
| 4,698,472 | 10/1987 | Cox et al. | 219/10.55 E |
| 4,751,358 | 6/1988 | Durand | 219/10.55 E |
| 4,806,718 | 2/1989 | Seaborne et al. | 219/10.55 E |
| 4,808,780 | 2/1989 | Seaborne | 219/10.55 E |
| 4,814,568 | 3/1989 | Keefer | 219/10.55 E |
| 4,818,831 | 4/1989 | Seaborne | 219/10.55 E |
| 4,825,024 | 4/1989 | Seaborne | 219/10.55 E |
| 4,825,025 | 4/1989 | Seiferth | 219/10.55 E |
| 4,865,921 | 9/1989 | Hollenberg et al. | 426/243 |
| 4,876,423 | 10/1989 | Tighe et al. | 219/10.55 E |
| 4,888,459 | 12/1989 | Keefer | 219/10.55 E |
| 4,892,782 | 1/1990 | Fisher et al. | 428/240 |
| 4,894,247 | 1/1990 | Fong | 219/10.55 E |
| 4,904,836 | 2/1990 | Turpin et al. | 219/10.55 E |
| 4,914,266 | 4/1990 | Parks et al. | 219/10.55 E |
| 4,940,867 | 7/1990 | Peleg | 219/10.55 E |
| 4,954,383 | 9/1990 | King et al. | 428/198 |
| 4,962,000 | 10/1990 | Emslander et al. | 219/10.55 E |
| 5,019,681 | 5/1991 | Lorence et al. | 219/10.55 F |
| 5,021,293 | 6/1991 | Huang et al. | 219/10.55 E |
| 5,027,253 | 6/1991 | Lauffer et al. | 361/321 |

OTHER PUBLICATIONS

*Microwave Technology & Food Science: Where Are They In The Marketplace?* written by Harry A. Rubbright, "Microwave World", vol. 9, No. 6, 1988.

*The Microwave Patent Mess*, "Food & Beverage Marketing", Nov. 1989 by Fred Pfaff.

*Browning & Crisping The Functions, Design, and Operation Of Susceptors* "Microwave World", vol. 10, No. 6 by Charles Turpin.

*Using Science For Consumer Products: An ISMI-CAS Connection?* by John P. O'Meara, "Microwave World", vol. 9, No. 6, 1988.

Primary Examiner—Bruce A. Reynolds
Assistant Examiner—Tuan Vinh To
Attorney, Agent, or Firm—Kinney & Lange

[57] ABSTRACT

A microwave susceptor structure includes a first thick metal layer, and a second matching layer coupled to the thick metal layer. The matching layer is chosen to couple a desired amount of power into the thick metal layer.

32 Claims, 5 Drawing Sheets fig. 1 fig. 2 fig.3e fig. 3b fig. 4

THICK METAL MICROWAVE SUSCEPTOR

BACKGROUND OF THE INVENTION

Heating of foods in a microwave oven differs significantly from heating foods in a conventional oven. In a conventional oven, heat energy is applied to the exterior surface of the food and moves inward until the food is cooked. Thus, food cooked conventionally is typically hot on the outer surfaces and warm in the center.

Microwave cooking, on the other hand, involves absorption, by the food, of microwaves which characteristically penetrate far deeper into the food than does infrared (heat). Also, in microwave cooking, the air temperature in the microwave oven may be relatively low. Therefore, it is not uncommon for food cooked in a microwave oven to be cool on the surfaces and much hotter in the center. This makes it difficult to brown food and make it crisp. Therefore, it is difficult to make some food cooked in a microwave oven aesthetically pleasing.

In order to facilitate browning and crisping of food in a microwave oven, devices known as susceptors have been developed. Susceptors are devices which, when exposed to microwave energy, become very hot. By placing a susceptor next to a food product in a microwave oven, the surface of the food product exposed to the susceptor is surface heated by the susceptor and thereby becomes crisp and brown.

Many conventional susceptor structures have included a thin metal film, typically 60-100Å of Aluminum, deposited on a substrate such as polyester. The metalized layer of polyester is typically bonded, for support, to a support member such as a sheet of paper board or corrugated paper.

Conventional susceptors have certain drawbacks. They undergo a process called breakup in which the electrical continuity of the thin metal film is lost during cooking. This is described in more detail in the Wendt et al U.S. Pat. No. 4,927,991. The result of the loss of electrical continuity is an irreversible loss in the susceptor's microwave responsiveness and a lower level of percent power absorption in the susceptor during cooking. Lower power absorption leads to lower susceptor cooking temperatures and a corresponding decrease in the susceptor's ability to crisp food.

In order to further discuss the relevance of this deterioration, some other relationships should be set forth. The complex dielectric constant $\epsilon$ of a material is defined as follows:

$$\epsilon = \epsilon_0 \epsilon_r = \epsilon_0 (\epsilon_r' - j\epsilon_r'') \quad \text{Eq. 1}$$

where
- $\epsilon_0$ is the permitivity of free space, $8.854 \times 10^{-14}$ Farads/cm;
- $\epsilon_r$ is the complex relative dielectric constant of the susceptor, relative to free space;
- $\epsilon_r'$ is the real part of the complex relative dielectric constant $\epsilon_r$; and
- $\epsilon_r''$ is the imaginary part of the complex relative dielectric constant $\epsilon_r$. $\epsilon_r''$ is also known as the loss factor for the material.

As an example of conventional susceptor operation, a frozen food product could be placed on a susceptor. The susceptor and the food product could then be subjected to microwave energy. Since $\epsilon_r''$ (the imaginary part of the complex relative dielectric constant) of ice is very low, the frozen food product is initially a poor absorber of microwave energy. Therefore, the susceptor absorbs an excessive amount of the microwave energy and begins to deteriorate. Meanwhile, the frozen food product absorbs very little energy. This is undesirable. As the frozen food product thaws and starts absorbing microwave energy, the ability of the susceptor to absorb energy, and thereby surface heat the frozen food product, has already been deteriorated. Since this deterioration (i.e., the change in the electrical continuity of the susceptor) is generally irreversible, the susceptor is incapable of properly browning and crisping the food product.

In addition, as the susceptor deteriorates, it heats in a non-uniform fashion resulting in hot spots distributed along the surface of the susceptor. This results in uneven surface heating of the food products.

Further, as the susceptor deteriorates and the microwave transmissiveness of the susceptor increases, the food product may be subjected to an undesirable amount of dielectric heating. This can cause the food product to become tough or to attain other similarly unappealing qualities.

Therefore, there is a continuing need for the development of susceptor structures which are not plagued by the problems of thin metallic film-type susceptor structures.

SUMMARY OF THE INVENTION

The present invention is a microwave susceptor structure having a thick metal layer and a matching layer coupled to the thick metal layer. The matching layer couples a desired amount of power into the thick metal layer.

DETAILED DESCRIPTION OF THE PREFERRED EMBODIMENTS

Figure 1:
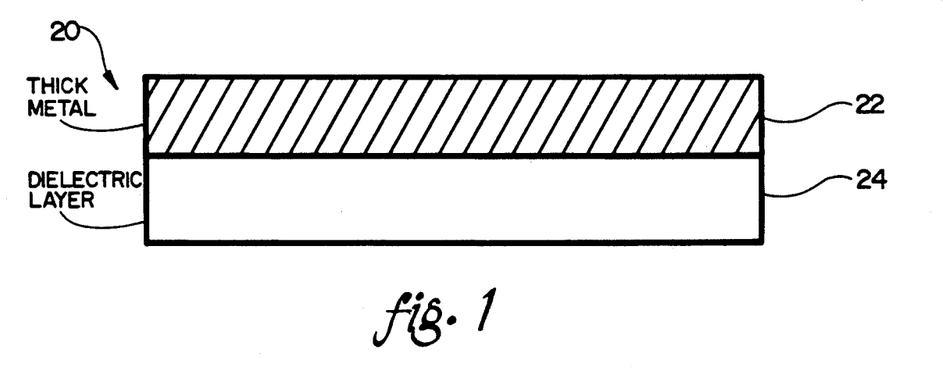
FIG. 1 is a drawing of a susceptor structure of the present invention.

FIG. 1 shows a susceptor 20 of the present invention. The susceptor 20 includes an electrically thick (greater than approximately 3 skin depths thick) metal layer 22 and an impedance matching dielectric layer 24. The metal layer 22 is typically bonded to layer 24 such that food, when placed on the thick metal layer 22, is isolated from any chemicals or other materials in layer 24.

Until not, it has generally been thought that thick metals would not make good susceptor structures since they have high electrical conductivity. Indeed, the thick metal portion 22 of the invented susceptor 20 will not heat significantly without the impedance matching dielectric layer 24.

In the present invention, the interaction of the susceptor with the microwaves provided by the microwave oven is viewed as a transverse electromagnetic (TEM) plane wave which propagates within the microwave oven. Hence, by choosing the proper dielectric layer 24, a desired amount of power can be coupled into thick metal layer 22. In other words, dielectric layer 24 is used as a matching layer for matching the wave impedance of the plane wave, as defined by the medium of transmission, generated by the microwave oven to that of the thick metal layer 22. By "matching" it is meant that the overall reflection coefficient of the dielectric and thick metal composite is reduced or eliminated and the power absorbed by the thick metal layer 22 is increased.

The wave impedance (Z) of the microwave is related to the characteristics of the wave front and the medium of transmission by the following relationship:

$$Z = \sqrt{\frac{\mu}{\epsilon}} \qquad \text{Eq. 2}$$

Where the medium of transmission is air, the wave impedance ($Z_0$) is substantially represented as:

$$Z_0 = \sqrt{\frac{\mu}{\epsilon_0}} = 377\Omega \qquad \text{Eq. 3}$$

By matching the impedance of the thick metal layer 22 with the wave impedance of the microwaves in the microwave oven a desired amount of power is coupled into the thick metal layer 22 and absorbed by susceptor 20. Thus, thick metal layer 22 heats when exposed to microwave energy.

To couple a maximum amount of power into the thick metal layer 22, quarter wave matching is used In other words, for maximizing power transfer, $$Z_{match} = \sqrt{Z_0 Z_{metal}} \qquad \text{Eq. 4}$$

where
$Z_{match}$ is the impedance of dielectric layer 24;
$Z_0$ is the characteristic impedance of free space, and
$Z_{metal}$ is the impedance of the thick metal layer 22.
The thickness (d) of dielectric layer 22 is chosen as:

$$d = \frac{\lambda_{match}}{4} \qquad \text{Eq. 5}$$

where $\lambda_{match}$ is the wavelength of the microwave in the matching layer 24. Thus, by choosing a dielectric layer 24 which has an appropriate relative dielectric constant $\epsilon_r$ and an appropriate thickness (d), the amount of power coupled into a metal layer 22 having a given electrical conductivity ($\sigma$) can be maximized.

Figure 2:
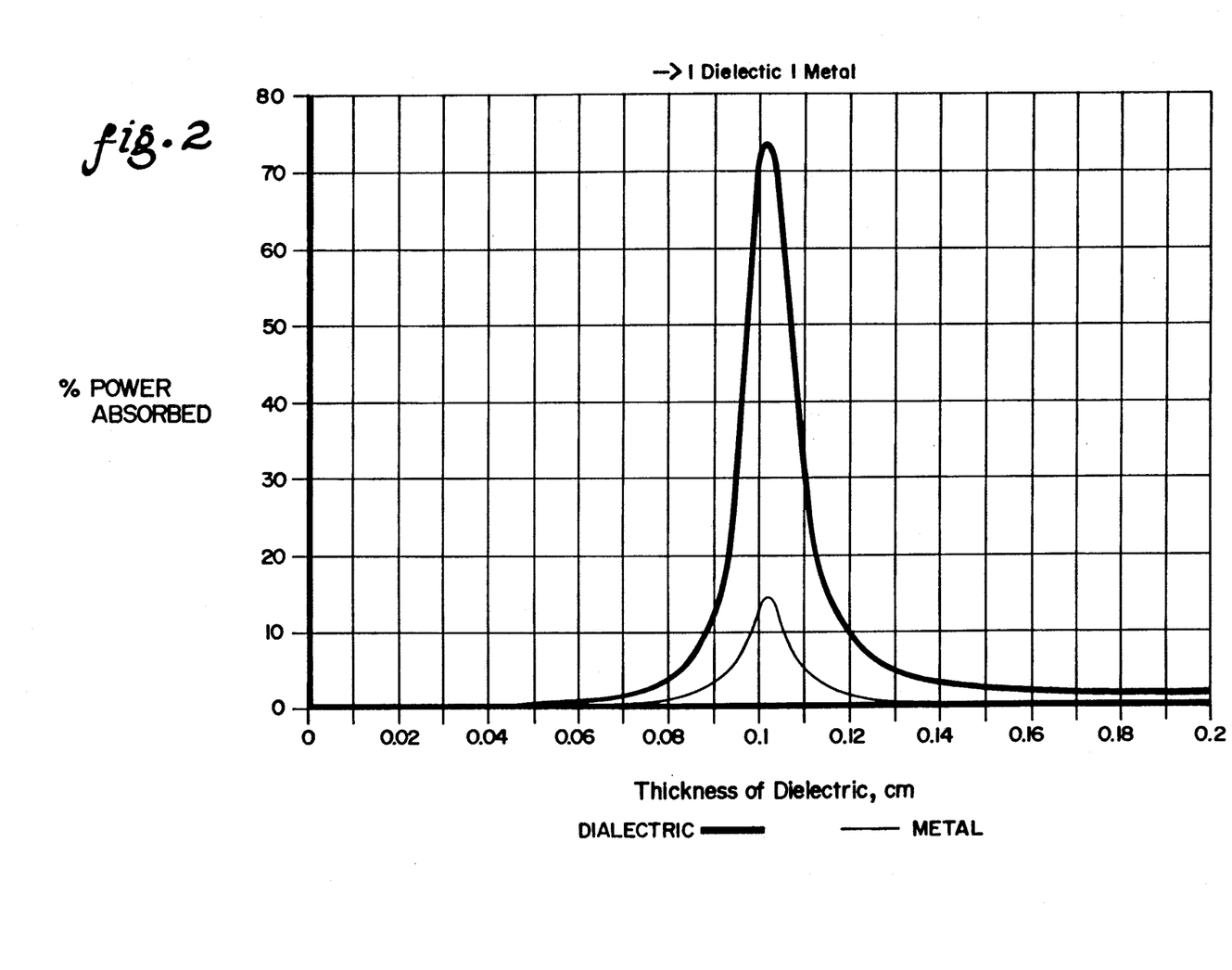
FIG. 2 is a graph showing percent power absorbed plotted against dielectric thickness for dielectric material and metal of the susceptor shown in FIG. 1.

It has been seen that, when metal layer 22 is formed of a thick metal such as aluminum foil, and when dielectric layer 24 is formed of a high dielectric material (e.g. a commercially available metal loaded polymer similar to that disclosed in EPO Publication No. 242,952 to E.I. DuPont De Nemours & Co.) the amount of power absorbed during miorowave heating is related to the thickness of the dielectric layer 24 as shown in FIG. 2. FIG. 2 shows a graph calculated from a computer model of the thickness of the dielectric material 24 plotted against the calculated percent absorbed power by susceptor 20 during microwave heating. FIG. 2 shows that a great percentage of the system power can be absorbed by susceptor 20 if metal layer 22 and dielectric layer 24 are chosen properly.

Figure 3A:
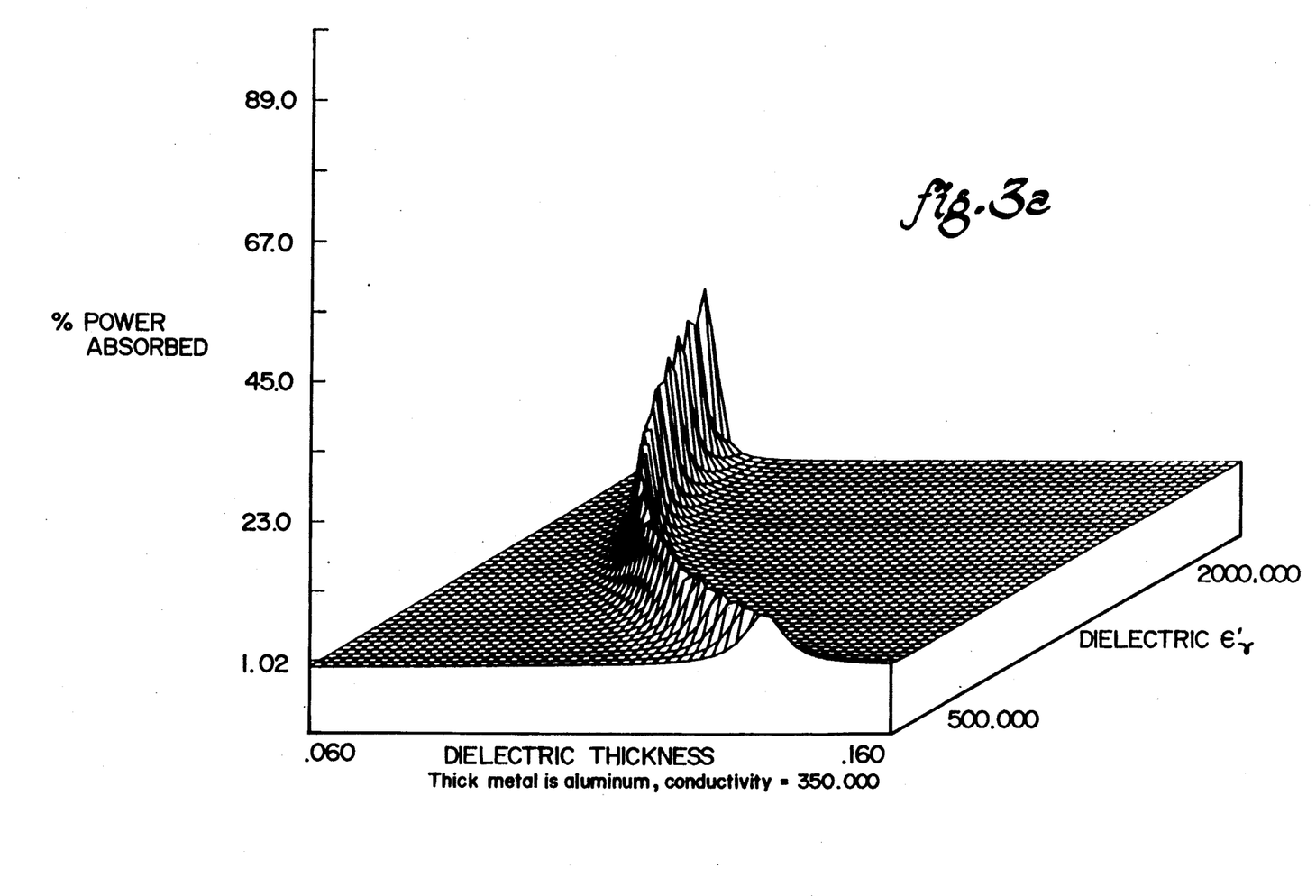
FIG. 3A shows a three dimensional plot of percent power absorbed by a first embodiment of a susceptor of the present invention.

Computer simulations have been run in which the thickness of the dielectric layer 24 and the complex dielectric constant of the dielectric layer 24 were systematically varied. For example, in one case, the thickness of the dielectric layer 24 was varied from approximately 0.16 cm to 0.060 cm in approximately 50 steps. In addition, the complex relative dielectric constant of dielectric layer 24 was varied from 500-j0 to 2000-j0 in approximately 50 steps. It was assumed that metal layer 22 was aluminum with an electrical conductivity of $3.5 \times 10^5$/ ohm cm. The maximum system power absorbed was 28.4%. A three dimensional plot of the percent power absorbed by susceptor 20 plotted against the dielectric thickness and the complex relative dielectric constant of dielectric layer 24 used in the computer simulations is shown in FIG. 3A.

Figure 3B:
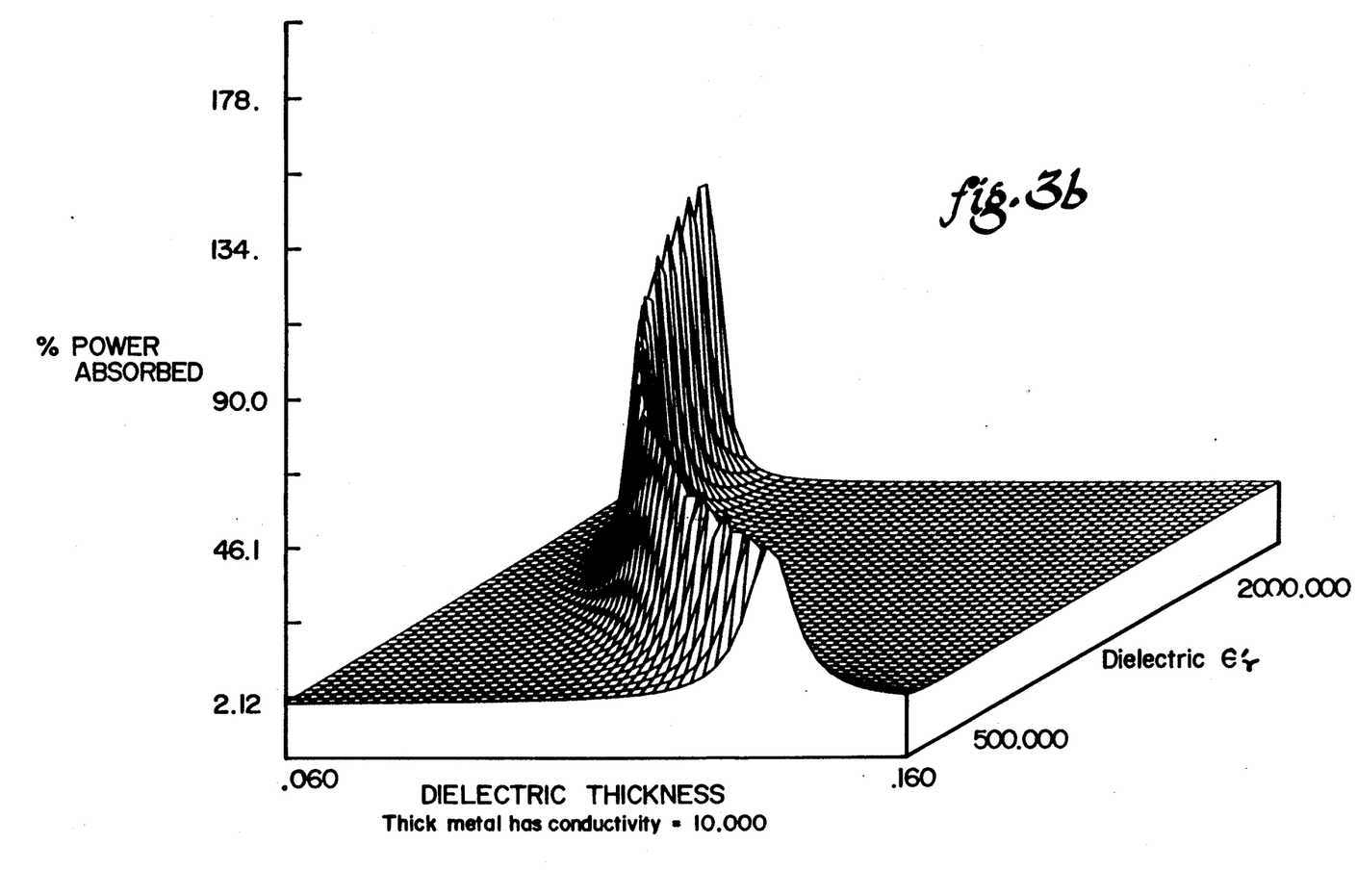
FIG. 3B shows a three dimensional plot of percent power absorbed by a second embodiment of a susceptor of the present invention.

Surprisingly, it has also been shown that, where the metal layer 22 is a poor conductor, more microwave power is absorbed by susceptor 20 than if the metal layer is a good conductor. For example, another computer simulation was run using a dielectric material having a complex relative dielectric constant varying from 500-j0 to 2000-j0 in approximately 50 steps. In addition, the simulation included metal layer 22 comprising Nichrome, having an electrical conductivity of $10^4$/ohm cm. A three dimensional plot showing the percent power absorbed by susceptor 20 using Nichrome plotted against the dielectric thickness and the complex relative dielectric constant of dielectric layer 24 is shown in FIG. 3B. The maximum power absorbed by susceptor 20 in this second case was 91.8%.

Thus, by choosing the dielectric layer 24 with an appropriate thickness and complex relative dielectric constant so that the impedance of the thick metal layer 22 is sufficiently matched to the wave impedance of the microwave generated by the microwave oven, substantially any desired amount of power can be coupled into the thick metal layer 22. B using this impedance matching technique, the thick metal is heated and operates properly as a susceptor in a microwave oven. While the present invention has been disclosed with a dielectric structure having a thickness ranging from 0.060 cm to 0.16 cm, and having a thick metal with an electrical conductivity of approximately $10^4$-$10^5$/ohm-cm, the present invention would include at least dielectric layers having a thickness in a range of approximately 0.010 cm to 0.20 cm, and at least thick metal layers having an electrical conductivity in a range of $10^3$-$10^6$/ohm-cm.

It is worth noting that microwave generated in microwave ovens may typically have a frequency of approximately 2,450 megahertz. Therefore, the desired amount of power can be coupled into the thick metal layer 22 by carefully choosing the impedance of susceptor 20 to match (or match sufficiently to couple the desired amount of power), the wave impedance of a microwave (typically modeled as a plane wave) at a frequency of 2,450 megahertz to the impedance of the thick metal layer 22. The present invention contemplates use with any number of microwave frequencies, including at least those in a range of approximately 2300-2600 Megahertz.

Also, although the value of the dielectric loss factor, $\epsilon_r''$, of the dielectric layer 24 is not critical, it should generally be as small as possible. If $\epsilon_r''$ of the dielectric layer 24 is too large, the dielectric layer 24 may heat excessively and, in certain cases, deteriorate.

Figure 4:
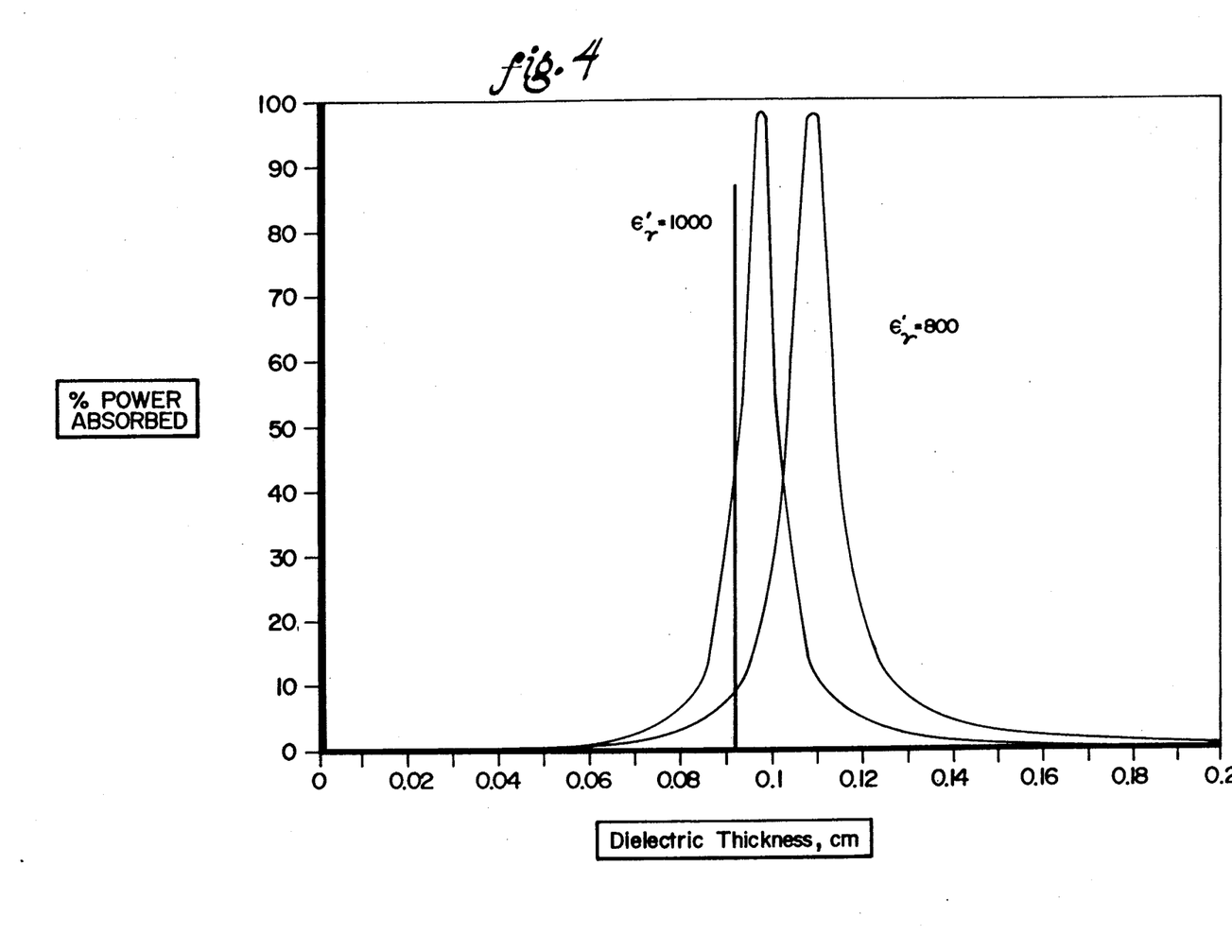
FIG. 4 is a graph showing percent power absorbed plotted against dielectric thickness.

It has also been noted that, in using susceptor structure 20 of the present invention, a certain amount of temperature control is possible. FIG. 4 shows a graph of electric thickness of dielectric layer 24 plotted against percent power absorption by susceptor 20. A dielectric material is chosen where the dielectric constant is temperature dependent. For example, as shown in FIG. 4, at a dielectric thickness of 0.092 cm, the real portion of the complex relative dielectric constant is 1000 when little or no microwave energy has been absorbed by susceptor 20 (i.e., when susceptor 20 is cold). At that point, the percent absorption capability of susceptor 20 is 40%. However, as susceptor 20 absorbs microwave energy and heats, the dielectric constant drops to 800 and the percent of system power absorbed by susceptor 20 is reduced to approximately 5%.

In other words, FIG. 4 shows two graphs where the dielectric constant shifts as the dielectric layer 24 heats. Initially, dielectric layer 24 heats very rapidly (40% absorption) and when it reaches a given temperature, its percent absorption drops to approximately 5% (the heater turns off). Thus, by using a proper dielectric material, one with a temperature dependent relative dielectric constant, temperature control can be achieved.

In one preferred embodiment, the high dielectric material layer 24 is Barium Titanate or Calcium Titanate. In another preferred embodiment, it is a metal flake artificial dielectric or any other high $\epsilon$ material.

CONCLUSION

By using the susceptor structure of susceptor 20, a surface heating susceptor can be achieved which cooks, in essence, like a frying pan. The heating is accomplished by currents within the metal layer 22, and metal layer 22 is highly arc resistant.

Also, the metal layer 22 electrically isolates the food from the dielectric layer 24. Thus, the electric field standing wave pattern inside the food remains relatively constant, unaffected by changes in the susceptor 20. The isolation provided by metal layer also prevents contamination of the food product by any chemicals in the dielectric layer.

Further, the dielectric layer 24 can be chosen with a dielectric constant which is temperature dependent. This allows temperature control to be achieved.

Although the present invention has been described with reference to preferred embodiments, workers skilled in the art will recognize that changes may be made in form and detail without departing from the spirit and scope of the invention.

What is claimed is:

1. An apparatus for converting microwave energy in a microwave oven into thermal energy, the microwave energy being conveyed by microwaves having a wave impedance, the apparatus comprising:
   a thick metal having a thickness of at least approximately three skin depths; and
   matching means, coupled to the thick metal, for matching a first impedance corresponding to the thick metal with the wave impedance sufficiently that the thick metal accordingly absorbs a controlled amount of incident microwave energy.

2. The apparatus of claim 1 wherein the matching means comprises:
   a dielectric material.

3. The apparatus of claim 2 wherein the thick metal comprises:
   a generally planar thick metal layer having a generally planar surface and an electrical conductivity.

4. The apparatus of claim 3 wherein the dielectric material comprises:
   a generally planar dielectric material having a generally planar surface, a dielectric constant and a thickness, and being coupled to the generally planar thick metal so that the generally planar surface of the thick metal layer is adjacent to, and faces the generally planar surface of the dielectric material.

5. The apparatus of claim 4 wherein the electrical conductivity of the thick metal, the dielectric constant and the thickness of the dielectric material have values sufficient to cause the controlled amount of microwave energy to be absorbed by the thick metal.

6. The apparatus of claim 3 wherein the dielectric material has a relative dielectric constant with a real part in a range of approximately 500 to 2000.

7. The apparatus of claim 3 wherein the dielectric material has a thickness in a range of approximately 0.010 cm to 0.20 cm.

8. The apparatus of claim 3 wherein the dielectric material comprises:
   Barium Titanate.

9. The apparatus of claim 3 wherein the dielectric material comprises:
   Calcium Titanate.

10. The apparatus of claim 3 wherein the dielectric material comprises:
    a metal flake artificial dielectric.

11. The apparatus of claim 1 wherein the matching means comprises:
    temperature dependent matching means for matching the first impedance with the wave impedance until the thick metal has a temperature which reaches a threshold level, and for mismatching the first impedance and the wave impedance when the temperature of the thick metal exceeds the threshold level.

12. The apparatus of claim 11 wherein the temperature dependent matching means comprises:
    a dielectric material having a relative dielectric constant which is temperature dependent.

13. The apparatus of claim 1 wherein the thick metal has an electrical conductivity in a range of approximately $10^3$/ohm-cm to $10^6$/ohm-cm.

14. A microwave susceptor suitable for use in a microwave oven, the microwave oven being capable of generating microwaves and transmitting microwave energy having a wave impedance, the microwave susceptor comprising:
    a thick metal having a thickness of at least approximately three skin depths; and
    matching means, coupled to the thick metal, for impedance matching incident microwave energy into the thick metal to couple a controlled amount of power into the thick metal.

15. The microwave susceptor of claim 14 wherein the matching means comprises:
    a dielectric material, coupled to the thick metal, having a dielectric impedance value, the dielectric impedance value chosen so that the susceptor structure absorbs the controlled amount of the incident microwave energy transmitted by the microwave oven.

16. A microwave susceptor of claim 15 wherein the dielectric material is a generally planar dielectric material.

17. The microwave susceptor of claim 16 wherein the thick metal is a generally planar thick metal layer having an electrical conductivity.

18. The microwave susceptor of claim 17 wherein the dielectric material has a dielectric constant and a thickness, and wherein the electrical conductivity of the thick metal, the dielectric constant and the thickness of the dielectric material have values sufficient to cause a controlled amount of power to be absorbed by the thick metal.

19. The microwave susceptor of claim 15 wherein the dielectric material has a relative dielectric constant with a real part in a range of approximately 500 to 2000.

20. The microwave susceptor of claim 15 wherein the dielectric material has a thickness in a range of approximately 0.010 cm to 0.20 cm.

21. The apparatus of claim 15 wherein the dielectric material comprises:
barium Titanate.

22. The apparatus of claim 15 wherein the dielectric material comprises:
calcium titanate.

23. The apparatus of claim 15 wherein the dielectric material comprises:
a metal flake artificial dielectric.

24. The microwave susceptor of claim 14 wherein the matching means comprises:
temperature dependent matching means for impedance matching incident microwave energy into the thick metal until the amount of power coupled into the thick metal causes the temperature of the thick metal to reach a threshold level, and for impedance mismatching the incident microwave energy when the temperature of the thick metal exceeds the threshold level.

25. The microwave susceptor of claim 20 wherein the temperature dependent matching means comprises:
a dielectric material having a relative dielectric constant which is temperature dependent.

26. The microwave susceptor of claim 14 wherein the thick metal has an electrical conductivity in a range of approximately $10^3$/ohms-cm to $10^6$/ohms-cms.

27. A microwave susceptor structure, comprising:
an electrically thick metal layer having a thickness of at least approximately three skin depths; and
a dielectric layer, coupled to the electrically thick metal layer, the dielectric layer having an impedance that sufficiently matches a first impedance corresponding to the electrically thick metal layer to a wave impedance corresponding to a microwave having a frequency in a range of 2300 to 2600 Megahertz so that a controlled amount of power transmitted by the microwave is coupled into the electrically thick metal layer.

28. The microwave susceptor structure of claim 27 wherein the electrically thick metal layer has a conductivity and wherein the dielectric layer has a thickness and a relative dielectric constant with a real portion, and wherein the conductivity of the thick metal layer, the thickness of the dielectric layer, and the real portion of the relative dielectric constant have values sufficient to cause the controlled amount of power transmitted by the microwaves to be coupled into the electrically thick metal layer.

29. The microwave susceptor structure of claim 28 wherein the real portion of the relative dielectric constant has a value that varies as temperature of the dielectric layer varies.

30. The microwave susceptor structure of claim 28 wherein the conductivity of the electrically thick metal layer is in a range of approximately $10^3$ per ohms-cm to $10^6$ per ohms-cm.

31. The microwave susceptor structure of claim 29 wherein the thickness of the dielectric layer is in a range of approximately 0.010 cm to 0.20 cm.

32. The microwave susceptor structure of claim 27 wherein the dielectric material has a relative dielectric constant with a real part in a range of approximately 500 to 2000.

* * * * *

UNITED STATES PATENT AND TRADEMARK OFFICE
CERTIFICATE OF CORRECTION

PATENT NO. 5,182,425  Page 1 of 2

DATED : January 26, 1993

INVENTOR(S) : PETER S. PESHECK, RONALD R. LENTZ

It is certified that error appears in the above-identified patent and that said Letters Patent is hereby corrected as shown below:

Col. 6, line 18, delete "claim 3", insert -- claim 2--

Col. 6, line 21, delete "claim 3", insert -- claim 2--

Col. 6, line 24, delete "claim 3", insert -- claim 2--

Col. 6, line 27, delete "claim 3", insert -- claim 2--

Col. 6, line 30, delete "claim 3", insert -- claim 2--

Col. 6, line 48, delete "$10^3$/ohm-cm to $10^6$/ohm-cm", insert $10^3$/oh$\underline{m}$-$\underline{c}$m to $10^6$/oh$\underline{m}$-$\underline{c}$m.

Col. 7, line 39, delete "claim 20", insert -- claim 24--

Col. 8, line 5, delete "$10^3$/ohms-cm to $10^6$/ohms-cm.", insert $10^3$/ohm$\underline{s}$-cm to $10^6$/ohm$\underline{s}$-$\underline{c}$ms.

Col. 8, line 34, delete "ohms-cm", insert "ohm$\underline{s}$-$\underline{c}$m

Col. 8, line 35, delete "ohms-cm.", insert "ohm$\underline{s}$-cm.

UNITED STATES PATENT AND TRADEMARK OFFICE
CERTIFICATE OF CORRECTION

PATENT NO. : 5,182,425
DATED : January 26, 1993
INVENTOR(S) : Peter S. Pesheck, et al.

It is certified that error appears in the above-indentified patent and that said Letters Patent is hereby corrected as shown below:

Column 8, line 36, delete "claim 29", insert --claim 28--.

Signed and Sealed this

Ninth Day of November, 1993

Attest:

BRUCE LEHMAN

*Attesting Officer*  *Commissioner of Patents and Trademarks*